US006242917B1

(12) United States Patent
Nistler et al.

(10) Patent No.: US 6,242,917 B1
(45) Date of Patent: Jun. 5, 2001

(54) MAGNETIC RESONANCE TRANSMISSION ANTENNA

(75) Inventors: Juergen Nistler; Wolfgang Renz, both of Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/497,638

(22) Filed: Feb. 3, 2000

(30) Foreign Application Priority Data

Mar. 29, 1999 (DE) ........................................ 199 14 220

(51) Int. Cl.[7] ........................................ G01V 3/00
(52) U.S. Cl. ........................................ 324/318; 324/322
(58) Field of Search ........................................ 324/318, 322, 324/300, 307, 309, 312, 314; 600/410, 421, 422

(56) References Cited

U.S. PATENT DOCUMENTS 4,887,038 12/1989 Votruba et al. ........................ 324/318
4,968,937 11/1990 Akgun ........................ 324/318
5,006,805 * 4/1991 Ingwersen ........................ 324/322
5,128,615 7/1992 Oppelt et al. ........................ 324/322
5,144,241 9/1992 Oppelt et al. ........................ 324/318
5,270,656 * 12/1993 Roberts et al. ........................ 324/318
5,280,249 1/1994 Kess ........................ 324/318
5,473,252 12/1995 Renz et al. ........................ 324/318
5,602,557 2/1997 Duerr ........................ 343/742
5,606,259 2/1997 Potthast et al. ........................ 324/378
5,708,361 1/1998 Wang et al. ........................ 324/318

FOREIGN PATENT DOCUMENTS

OS 42 38 831 5/1994 (DE) .

* cited by examiner

*Primary Examiner*—Louis Arana
(74) *Attorney, Agent, or Firm*—Schiff Hardin & Waite

(57) ABSTRACT

A magnetic resonance transmission antenna has at least two transmission elements that independently respectively generate a linearly polarized, discrete magnetic field, which are superimposed to form an overall magnetic field. The transmission elements are coupled to one another such that a transmission current fed into one of the transmission elements generates a coupled current in the other of the transmission elements, so that the overall magnetic field generated by the transmission elements is circularly polarized.

5 Claims, 1 Drawing Sheet

MAGNETIC RESONANCE TRANSMISSION ANTENNA

BACKGROUND OF THE INVENTION

1. Field of the Invention

The present invention is directed to a magnetic resonance transmission antenna of the type having at least two transmission elements that individually generate respective, linearly polarized, discrete magnetic fields that are superimposed to form a circularly polarized, overall magnetic field.

2. Description of the Prior Art

Magnetic resonance transmission antennas of the above general type are wellknown, for example, in German OS 44 34 948, German OS 43 22 352, German OS 41 38 690, U.S. Pat. Nos. 5,144,241 and 5,606,259.

In these known antennas, currents that are offset in phase by 90° are supplied into two transmission elements in order to generate the circularly polarized, overall magnetic field. To this end, a transmission current is divided into two sub-currents that are offset in phase by 90° relative to one another and that are set to the same amplitude in matching circuits. The sub-currents are then supplied into the transmission elements. The transmission elements are decoupled from one another in a complicated way in order to avoid unwanted couplings and to thus obtain a purely circularly polarized, overall magnetic field.

SUMMARY OF THE INVENTION

An object of the present invention is to provide a simply constructed magnetic resonance transmission antenna that generates a purely circularly polarized, overall magnetic field.

This object is inventively achieved in a magnetic resonance transmission antenna having transmission elements that are coupled to one another such that a transmission current fed into one of the transmission elements generates a phase-offset coupled current in the other of the transmission elements. Given a suitable coupling, the overall magnetic field generated by the transmission elements is then also circularly polarized.

In contrast to conventional antennas, thus, the coupling between the transmission elements is intentionally intensified in order to obtain a phase offset between the emitted, discrete magnetic fields via the coupling of the transmission elements and thus to obtain a circularly polarized, overall magnetic field. Given exactly two transmission elements, in particular, the coupling must be such that the coupled current is of the same magnitude as the transmission current, and such that the phase offset exactly corresponds to the angular offset of the discrete magnetic fields.

Optionally, the coupling between the transmission antennas can be inductive, capacitive or mixed inductive-capacitive.

The efficiency of the magnetic resonance transmission antenna is especially high when the transmission elements are tuned to a common resonant frequency.

DESCRIPTION OF THE PREFERRED EMBODIMENTS

Figure 1:
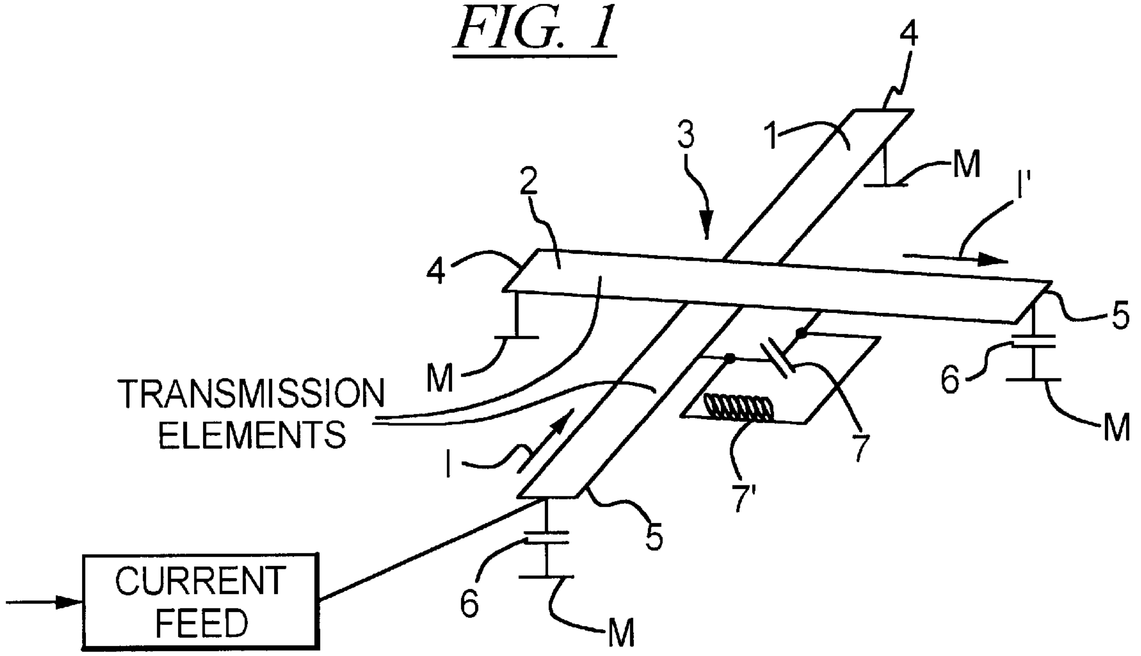
FIG. 1 illustrates a simple magnetic resonance transmission antenna constructed and operating in accordance with the invention.

As shown in FIG. 1, a magnetic resonance transmission antenna has two transmission elements 1 and 2. The transmission elements 1 and 2 cross one another at a right angle in a crossing region 3. The transmission elements 1 and 2 are tuned to a common resonant frequency f. Viewed independently, each of the transmission elements 1 and 2 generates a linearly polarized, discrete magnetic field. Due to the arrangement of the transmission elements 1 and 2 relative to one another, the discrete magnetic fields respectively generated by the transmission elements 1 and 2 are thus polarized perpendicularly to one another.

Each of the transmission elements 1 and 2 has ends 4 and 5. One end of each of the transmission elements 1 and 2—the end 4 here—is connected directly to ground M. Each of the other ends—the end 5 here—is connected to ground via respective terminating capacitors 6.

At the end 5, which is connected to ground M via the terminating capacitor 6, the transmission element 1 has a feed point for feeding a transmission current I. As a result, an alternating current that generates a linearly polarized, discrete magnetic field can flow in this transmission element 1.

The transmission elements 1 and 2 are capacitively connected to one another in the crossing region 3 via a coupling capacitance 7. Alternatively, however, the coupling can be inductive or mixed inductive-capacitive. An inductance 7' is therefore also shown in FIG. 1.

Due to the coupling capacitance 7, further coupling between the transmission elements 1 and 2 arises together with the intrinsic coupling between the transmission elements 1 and 2. As a result, the transmission current I fed into the transmission element 1 is coupled into the transmission element 2 as a coupled current I' offset in phase by 90°. This thus emits a discrete magnetic field that is offset in phase by 90° compared to the first-cited discrete magnetic field. When the coupled current I' has the same amplitude as the transmission current, an exactly circularly polarized, overall magnetic field thus derives due to superimposition of the discrete magnetic fields. The exact value of the coupling capacitance 7, and of the inductance 7' (if present), can be determined easily by trials.

Figure 2:
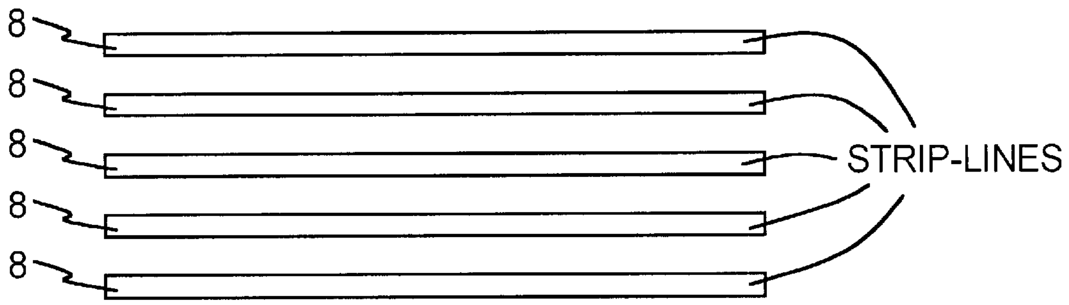
FIG. 2 illustrates a transmission element suitable for use in the inventive antenna.

As shown in FIG. 2, the transmission elements 1 and 2 are each fashioned in practice as a parallel circuit of a number of flat striplines 8. Only the striplines 8 of one of the transmission elements 1 and 2 are thereby shown in FIG. 2. The striplines 8 of the other of the transmission elements 1 and 2 are fashioned in the same way, and proceed under the striplines 8 of the one of the transmission elements 1 and 2 perpendicular thereto.

Although modifications and changes may be suggested by those skilled in the art, it is the intention of the inventors to embody within the patent warranted hereon all changes and modifications as reasonably and properly come within the scope of their contribution to the art.

We claim as our invention:

1. A magnetic resonance transmission antenna comprising:

two transmission elements, each of said transmission elements generating a linearly polarized, discrete magnetic field and the respective discrete magnetic fields of said two transmission elements being superimposed to form an overall magnetic field; and a coupling arrangement between said two transmission elements which causes a transmission current fed into one of said transmission elements to generate a phase-offset coupled current in the other of said transmission elements, to produce a circularly polarized overall magnetic field.

2. A magnetic resonance transmission antenna as claimed in claim 1 wherein said transmission elements are capacitively coupled to each other.

3. A magnetic resonance transmission antenna as claimed in claim 1 wherein said transmission elements are inductively coupled to each other.

4. A magnetic resonance transmission antenna as claimed in claim 1 wherein said transmission elements are coupled to each other by a mixed inductive-capacitive arrangement.

5. A magnetic resonance transmission antenna as claimed in claim 1 wherein said transmission elements are tuned to a common resonant frequency.

* * * * *